US011328136B2

(12) United States Patent
Fang et al.

(10) Patent No.: US 11,328,136 B2
(45) Date of Patent: May 10, 2022

(54) OPTICAL COMMUNICATION DEVICE AND METHOD FOR TRANSMITTING AND RECEIVING INFORMATION

(71) Applicant: BEIJING WHYHOW INFORMATION TECHNOLOGY CO., LTD, Beijing (CN)

(72) Inventors: Jun Fang, Xi'an (CN); Xuheng Niu, Beijing (CN); Jiangliang Li, Beijing (CN)

(73) Assignee: BEIJING WHYHOW INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/207,579

(22) Filed: Mar. 19, 2021

(65) Prior Publication Data

US 2021/0209318 A1 Jul. 8, 2021

Related U.S. Application Data

(63) Continuation of application No. PCT/CN2019/086000, filed on May 8, 2019.

(30) Foreign Application Priority Data

Sep. 25, 2018 (CN) .......................... 201811119052.5

(51) Int. Cl.

| | |
|---|---|
| ***G06K 7/10*** | (2006.01) |
| ***G06K 19/06*** | (2006.01) |
| ***H04B 10/40*** | (2013.01) |

(52) U.S. Cl.

CPC ......... *G06K 7/10* (2013.01); *G06K 19/06028* (2013.01); *H04B 10/40* (2013.01); *G06K 2007/10485* (2013.01)

(58) Field of Classification Search

CPC ............... G06K 7/10; G06K 19/06028; G06K 2007/10485; G06K 7/10732;

(Continued)

(56) References Cited

U.S. PATENT DOCUMENTS

| | | | | |
|---|---|---|---|---|
| 10,186,199 B2 * | 1/2019 | Jeon | ..................... | G09G 3/3225 |
| 10,861,393 B2 * | 12/2020 | Kim | ..................... | G09G 3/3266 |

(Continued)

FOREIGN PATENT DOCUMENTS

| | | |
|---|---|---|
| CN | 101023607 A | 8/2007 |
| CN | 103390146 A | 11/2013 |

(Continued)

OTHER PUBLICATIONS

International Search Report issued in corresponding International Application No. PCT/CN2019/086000, dated Jul. 25, 2019, 4 pages.

(Continued)

*Primary Examiner* — Abbas H Alagheband

(74) *Attorney, Agent, or Firm* — Bayes PLLC

(57) ABSTRACT

Disclosed are an optical communication device and a method for transmitting and receiving information. The optical communication device includes at least two light sources including a first light source and a second light source, and a controller configured to drive the first light source and the second light source in one or more driving modes. The first light source and the second light source are driven in a same driving mode for transmitting first information, and the first light source and the second light source are driven in different driving modes including a first driving mode and a second driving mode which have the same or different frequencies for transmitting other information different from the first information.

16 Claims, 9 Drawing Sheets

Row selector

Amplifier

ADC

Pixel value

(58) Field of Classification Search

CPC .. G06K 7/10752; G06K 7/146; G06K 7/1404; H04B 10/40; H04B 10/116; H04B 10/11; H04B 10/572; H04N 5/2256; H04N 5/2253; H04N 21/436; H04W 76/14

See application file for complete search history.

(56) References Cited

U.S. PATENT DOCUMENTS

| | | | | |
|---|---|---|---|---|
| 2009/0195402 | A1* | 8/2009 | Izadi | H04W 76/14 340/686.6 |
| 2011/0084958 | A1* | 4/2011 | Choi | G09G 3/3233 345/76 |
| 2012/0127212 | A1* | 5/2012 | Lin | G09G 3/003 345/102 |
| 2016/0191159 | A1* | 6/2016 | Aoyama | H04B 10/116 398/172 |
| 2017/0092191 | A1* | 3/2017 | An | G09G 3/3233 |
| 2018/0011194 | A1* | 1/2018 | Masuda | G01S 17/10 |
| 2018/0033399 | A1* | 2/2018 | Kawashima | G02F 1/133553 |
| 2019/0289190 | A1* | 9/2019 | Kunishige | H04N 5/2357 |

FOREIGN PATENT DOCUMENTS

| | | | |
|---|---|---|---|
| CN | 103650383 | A | 3/2014 |
| CN | 101755485 | B | 6/2014 |
| CN | 103959909 | A | 7/2014 |
| CN | 204537192 | U | 8/2015 |
| CN | 104966415 | A | 10/2015 |
| CN | 105740936 | A | 7/2016 |
| CN | 106372556 | A | 2/2017 |
| CN | 106372701 | A | 2/2017 |
| CN | 107111882 | A | 8/2017 |
| JP | 2004312321 | A | 11/2004 |
| KR | 20180103393 | A | 9/2018 |
| WO | 2017128982 | A1 | 8/2017 |
| WO | 2018041136 | A1 | 3/2018 |

OTHER PUBLICATIONS

Search Report issued in corresponding Chinese Application No. 2018111190525, dated Sep. 15, 2021, 6 pages.

First Search Report issued in corresponding Taiwan Patent Application No. 108119212, dated Feb. 17, 2020, 1 pages.

Second Search Report issued in corresponding Taiwan Patent Application No. 108119212, dated Jun. 15, 2021, 1 pages.

* cited by examiner

Fig. 3
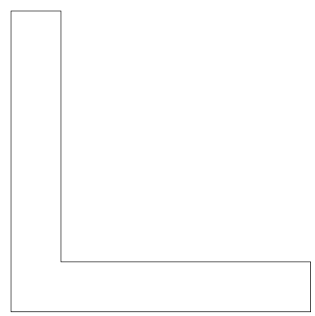
Fig. 4
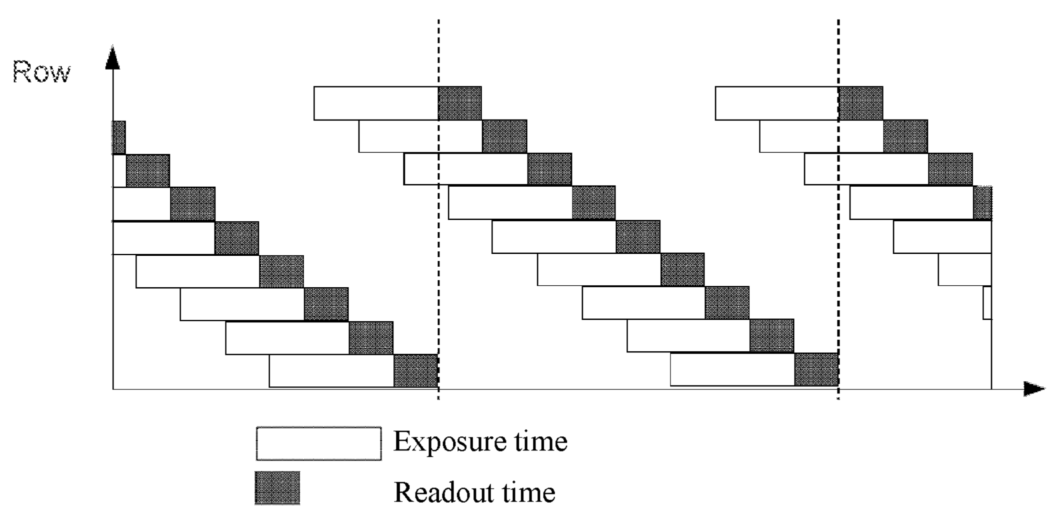
Fig. 5

OPTICAL COMMUNICATION DEVICE AND METHOD FOR TRANSMITTING AND RECEIVING INFORMATION

CROSS-REFERENCE TO RELATED APPLICATIONS

The present application is a by-pass continuation application of PCT International Application No. PCT/CN2019/086000 filed May 8, 2019, which claims priority to Chinese Patent Application No. 201811119052.5 filed on Sep. 25, 2018, both of which are hereby incorporated by reference in their entireties.

TECHNICAL FIELD

The present disclosure is directed to the technical field of optical information, and more particularly directed to an optical communication device (also referred to as an "optical tag" herein) and a method for transmitting and receiving information.

BACKGROUND

Bar codes and QR codes have been widely used to encode information. When these bar codes and QR codes are scanned with a specific device or software, corresponding information will be identified. However, the distance from which bar codes and QR codes can be identified is limited. For example, when scanning a QR code with a camera of a mobile phone, the mobile phone must be kept within a relatively close range, which is usually only about 15 times the width of the QR code. Therefore, bar codes and QR codes of normal size cannot be identified at a long distance. Long-range identification can be achieved by customizing very large bar codes and QR codes, but this will bring about a significant increase in cost and is impossible in many cases due to other various constraints (such as space constraints).

Due to the constraints in terms of identification distance, the bar codes and QR codes are inconvenient in many application scenarios. For example, when purchasing tickets or goods by scanning a posted QR code with a mobile phone, if there are too many people, people who are far away from the QR code will not be able to identify the QR code with their mobile phones, but will have to wait for the people in front of them to leave before approaching the QR code for corresponding operations, which is extremely time-consuming and inconvenient. Therefore, there is a need in the art for a scheme that enables long-range identification of information.

SUMMARY

One aspect of the present disclosure relates to an optical communication device including at least two light sources, including a first light source and a second light source; and a controller configured to drive the first light source and the second light source in at least two driving modes including a first driving mode and a second driving mode. Driving signals of the first driving mode and the second driving mode have the same or different frequencies, where the first light source and the second light source are driven in the same driving mode for transmitting first information; and the first light source and the second light source are driven in the different driving modes for transmitting other information different from the first information.

Another aspect of the present disclosure relates to a method for transmitting information using at least two light sources, where the at least two light sources include a first light source and a second light source configured to be driven in at least two driving modes, and the at least two driving modes include a first driving mode and a second driving mode which have the same or different frequencies. The method includes driving the first light source and the second light source in the same driving mode when there is a need to transmit first information; and driving the first light source and the second light source in different driving modes when there is a need to transmit other information different from the first information.

Another aspect of the present disclosure relates to a device for transmitting information using at least two light sources, which includes a controller for controlling the at least two light sources. The controller is configured to implement the above method.

Another aspect of the present disclosure relates to an optical communication system that includes the above optical communication device, and an apparatus for identifying information transmitted by the optical communication device. The apparatus is configured to image the optical communication device, extract an image of a first light source in the optical communication device and an image of a second light source in the optical communication device, compare the image of the first light source with that of the second light source, and determine information jointly transmitted by the first light source and the second light source based at least in part on a result of the comparison.

Another aspect of the present disclosure relates to a method for receiving information transmitted by the optical communication device. The method includes imaging the optical communication device; extracting an image of a first light source in the optical communication device and an image of a second light source in the optical communication device; comparing the image of the first light source with that of the second light source; and determining information jointly transmitted by the first light source and the second light source based at least in part on a result of the comparison.

Another aspect of the present disclosure relates to a device for receiving information transmitted by the optical communication device, including an imaging device, a processor and a memory storing a computer program which, when executed by the processor, implements the above method.

Another aspect of the present disclosure relates to a storage medium storing a computer program which, when executed, implements the above method.

According to the present disclosure, the information transmitted by a pair of light sources is obtained by comparing the images of the light sources which are mutually referenced and used in conjunction with each other (instead of only analyzing the image of a certain light source individually), so that the influences of ambient lighting conditions, interference, noise and the like are reduced. Therefore, the accuracy and stability of identifying the information transmitted by the light sources can be improved, and the present disclosure is suitable for long-range and outdoor identification. Furthermore, as the information transmitted by the pair of light sources is obtained by comparing the images of the light sources according to the present disclosure, there is no need to include a large number of stripes in the image of each light source (in some cases, there is even no need to include a complete stripe), which further facilitates long-range identification and allows to reduce the signal frequency of the driving mode for generating stripes in the images of the light sources.

BRIEF DESCRIPTION OF THE DRAWINGS

Embodiments of the present disclosure will be further described below with reference to the accompanying drawings, in which:

FIG. 3 shows an exemplary light source according to an embodiment of the present disclosure;

FIG. 4 shows another exemplary light source according to an embodiment of the present disclosure;

FIG. 5 is an exemplary imaging sequence diagram of a CMOS imaging device, according to an embodiment of the present disclosure;

DETAILED DESCRIPTION

Figure 1:
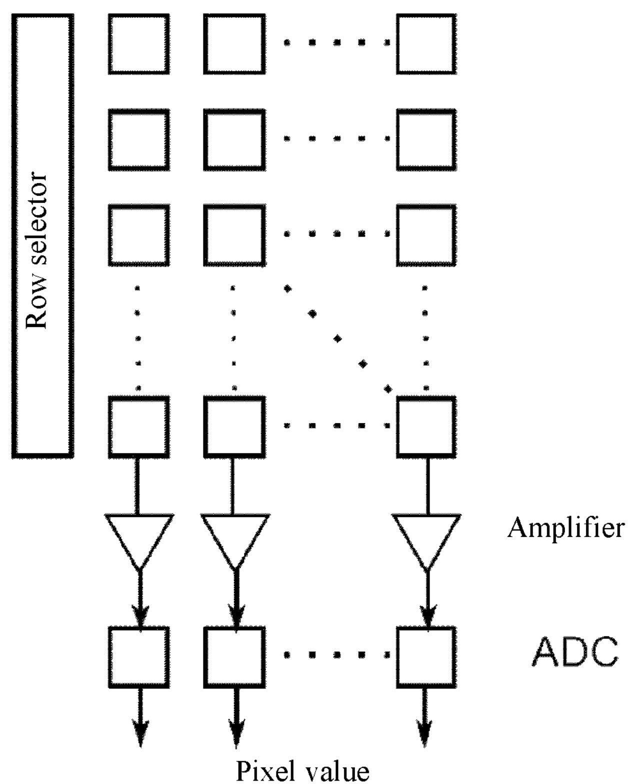
FIG. 1 is a schematic diagram of an exemplary CMOS imaging device, according to an embodiment of the present disclosure.

In order to make the objective, technical schemes and advantages of the present disclosure clearer, the present disclosure will be further described in detail below with reference to the accompanying drawings by way of embodiments.

An embodiment of the present disclosure relates to an optical communication device, which is also referred to herein as an "optical tag", and the two terms may be used interchangeably throughout the application.

The optical communication device includes a light source, and light emitted by the light source can be sensed by an optical imaging device and may be perceptible or imperceptible to human eyes. The light emitted by the light source may be of specific intensity, color, wavelength, etc. When the light source operates, it may be imaged with an imaging device or a device with an imaging device (such as a mobile phone, a tablet computer, and smart glasses). The light source may be light sources of various forms, for example, it may be an LED light, an array consisting of a plurality of LED lights, a display screen or a portion thereof, and even an illuminated area of light (such as the illuminated area of light on a wall) may also serve as the light source. The light source may be in various shapes, such as round, square, rectangle, stripe, and L-shape. The light source may include various common optical devices, such as light guide plates, soft light plates, and diffusers. In a certain embodiment, the light source may be a two-dimensional array consisting of a plurality of LED lights, and one dimension of the two-dimensional array is longer than the other dimension, in some embodiments in a ratio of about 5-12:1. For example, the LED light array may consist of a plurality of LED lights lined up in a row. When emitting light, the LED light array may be presented as a roughly stripe light source with its operation controlled by a controller.

In another embodiment, the light source is not limited to a planar light source, but may be implemented as a stereoscopic light source, such as a bar-shaped cylindrical light source, a cubic light source, and a spherical light source. For example, the light source may be placed at a square or suspended at a certain position in an indoor place (such as a restaurant, and a conference room), so that nearby users in all directions can capture the light source with their mobile phones to obtain the information transmitted by the light source.

At present, CMOS imaging devices widely used in electronic devices typically image with a rolling shutter, that is, pixels in a frame of image are not exposed at the same time (e.g., the pixels are exposed row by row). According to the present disclosure, the non-simultaneous exposure characteristic of imaging with the rolling shutter is advantageously utilized, so that when the light source is driven in different driving modes, various stripe patterns or stripe-free patterns may be presented on the image of the light source obtained by capturing the light source with a rolling shutter imaging device. By analyzing and identifying the patterns in the image of the light source, the information transmitted by the optical communication device can be identified.

FIG. 1 shows an exemplary CMOS imaging device which includes an array of image sensors (also called image sensing units) and some other elements. Each image sensor in the image sensor array corresponds to one pixel. Each column of image sensors is connected to a column amplifier, and an output signal of the column amplifier is sent to an A/D converter (ADC) for analog-to-digital conversion, and then output through an interface circuit. For any image sensor in the image sensor array, its signal value is first zeroed at the beginning of the exposure, and then read after the exposure. The CMOS imaging device typically images with the rolling shutter. In the CMOS imaging device, the readout of data is serial, so the zeroing/exposure/readout is only performed row by row in a pipeline-like manner, and the data are integrated into one frame of image after all the rows of the image sensor array are processed. Therefore, the entire CMOS image sensor array is actually exposed row by row (in some cases, the CMOS image sensor array may also be exposed by multiple rows at a time), which results in a small time delay between the rows. Because of this small time delay, when the light source flickers at a certain frequency (e.g., by turning on and off the light source), stripes will be presented on the image captured by the CMOS imaging device.

Figure 2:
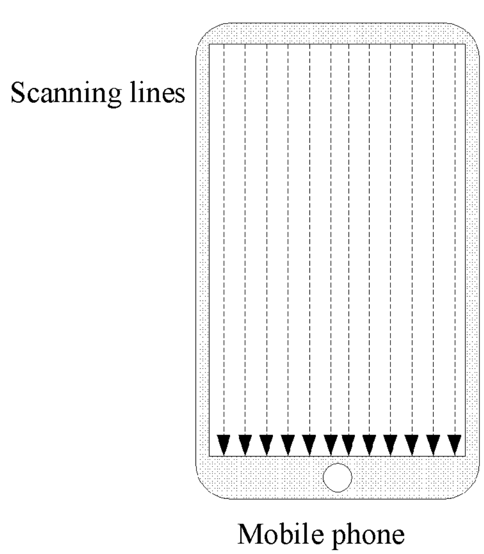
FIG. 2 is a schematic diagram showing an exemplary direction of a CMOS imaging device to acquire an image, according to an embodiment of the present disclosure.

When the light source operates, the light source may be imaged with a CMOS imaging device or a device with the CMOS imaging device (such as a mobile phone, a tablet computer, and smart glasses), which is imaged with a rolling shutter. The following is an example of taking a mobile phone as a CMOS imaging device, as shown in FIG. 2. The row scanning direction of the mobile phone is vertical as shown in FIG. 2. However, it can be understood that the row scanning direction may also be horizontal depending on the underlying hardware configuration.

FIG. 3 shows a light source according to an embodiment of the present disclosure. When the light source shown in FIG. 3 is imaged with the CMOS imaging device, in some embodiments a long side of the light source shown in FIG. 3 is made perpendicular or approximately perpendicular to a row direction of the CMOS imaging device (e.g., the row scanning direction of the mobile phone shown in FIG. 2), so as to produce as many stripes as possible under otherwise identical conditions. However, sometimes users do not know the row scanning direction of their mobile phone. In order for the mobile phone can perform identification in all poses and the maximum identification distance can be reached in portrait and landscape orientations, the light source may be a combination of a plurality of rectangles. For example, the light source may be an L-shaped light source as shown in FIG. 4.

FIG. 5 is an imaging sequence diagram of the CMOS imaging device, where each row corresponds to a row of sensors of the CMOS imaging device. There are two main stages involved in imaging of each row of the CMOS imaging sensor array, namely exposure time and readout time. The exposure time of each row may overlap, but the readout time will not.

It should be noted that only a few rows are schematically shown in FIG. 5. However, there are typically thousands of rows of CMOS image sensors in practice depending on different resolutions. For example, for a resolution of 1080p, the CMOS imaging device has 1920×1080 pixels, where 1080 represents 1080 scanning rows, and 1920 represents 1920 pixels per row. When the resolution is 1080p, the readout time of each row is approximately 8.7 μs (i.e., $8.7\times10^{-6}$ s).

Figure 6:
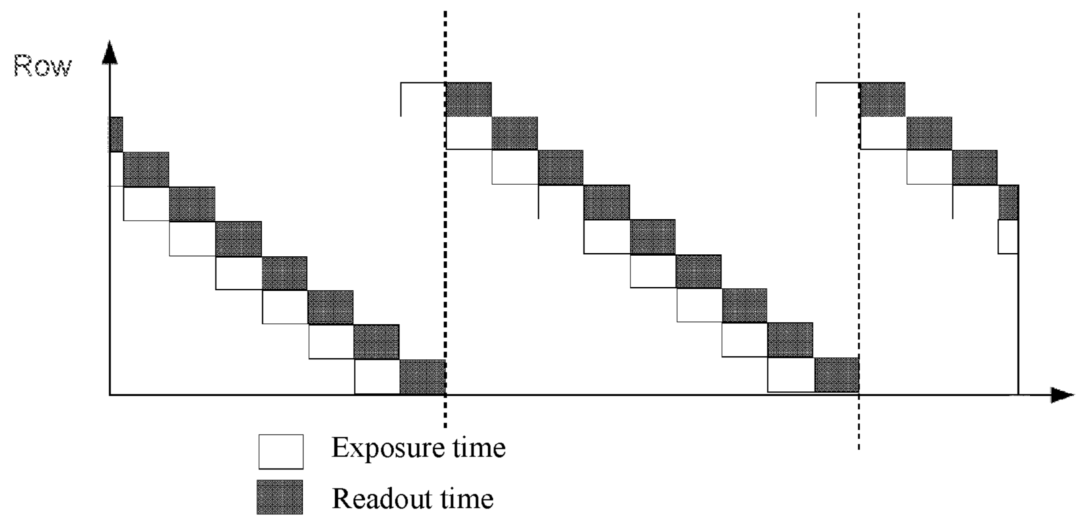
FIG. 6 is another exemplary imaging sequence diagram of a CMOS imaging device, according to an embodiment of the present disclosure.

If a too long exposure time results in a significant overlap in the exposure time between adjacent rows, there may be obvious transition stripes during imaging, e.g., a plurality of pixel rows with different gray scales between pure black pixel rows and pure white pixel rows. According to the present disclosure, the pixel rows are expected to be as clear as possible, so the exposure time of each row of the CMOS imaging device (e.g., a mobile phone) may be set or adjusted (e.g., through an APP installed on the mobile phone) to select a relatively short exposure time. In some embodiments, the exposure time may be made approximately equal to or less than the readout time of each row. By taking the resolution of 1080p as an example, the readout time for each row is about 8.7 μs. In this case, the exposure time of the mobile phone may be adjusted to about 8.7 μs or less. FIG. 6 is an imaging sequence diagram of the disclosed CMOS imaging device. In this case, there is little or no overlap in the exposure time of each row basically, so that stripes with clear boundaries may be obtained during imaging, which are easier to be identified. It should be noted that FIG. 6 is only one embodiment of the present disclosure, and longer (e.g., equal to or less than twice, three times or four times the readout time of each row) or shorter exposure time is also feasible. For example, the readout time of each row may be approximately 8.7 μs, and the exposure time of each row may be set to 14 μs. In addition, in order to produce stripes, the duration of one cycle of a driving signal of a light source driving mode may be set to about twice the exposure time or longer.

Figure 7:
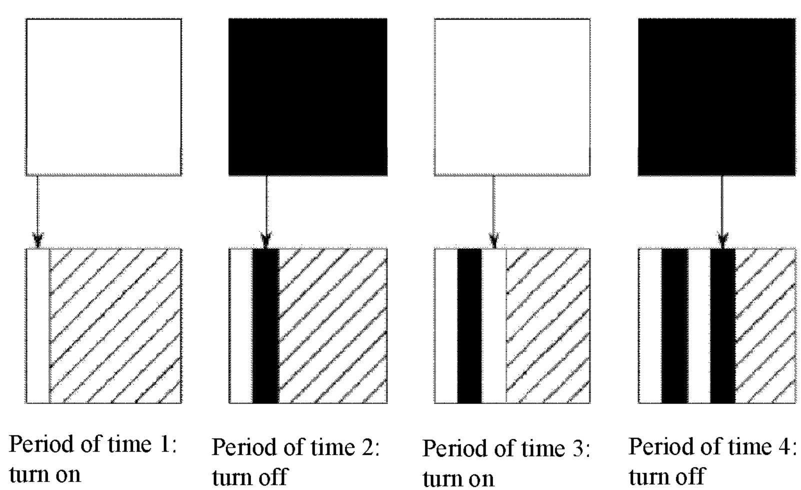
FIG. 7 shows an exemplary imaging diagram implemented by a CMOS imaging device at different stages when a light source is driven in a certain driving mode, according to an embodiment of the present disclosure.

FIG. 7 shows an imaging diagram on the CMOS imaging device at different stages when the controller turns on and off the light source at a certain frequency in a certain driving mode. Specifically, the upper part of FIG. 7 is a state change diagram of the light source at different stages (white indicates that the light source is on and black indicates that the light source is off), and the lower part is an imaging diagram of the light source on the CMOS imaging device at different stages, where the row direction of the CMOS imaging device is vertical and scanning is performed from left to right. Since the CMOS imaging device acquires images in a progressive scan, when it captures a high-frequency flicker signal, stripes as shown in the lower part of FIG. 7 will be formed on a portion of a frame of image obtained corresponding to an imaging position of the light source. Specifically, in a time period 1, the light source is turned on, and the scanned rows exposed in this time period produce a bright stripe on the leftmost part. In a time period 2, the light source is turned off, and the scanned rows exposed in this time produce a dark stripe. In a time period 3, the light source is turned on, and the scanned rows exposed in this time period produce a bright stripe. In a time period 4, the light source is turned off, and the scanned rows exposed in this time period produce a dark stripe.

Figure 8:
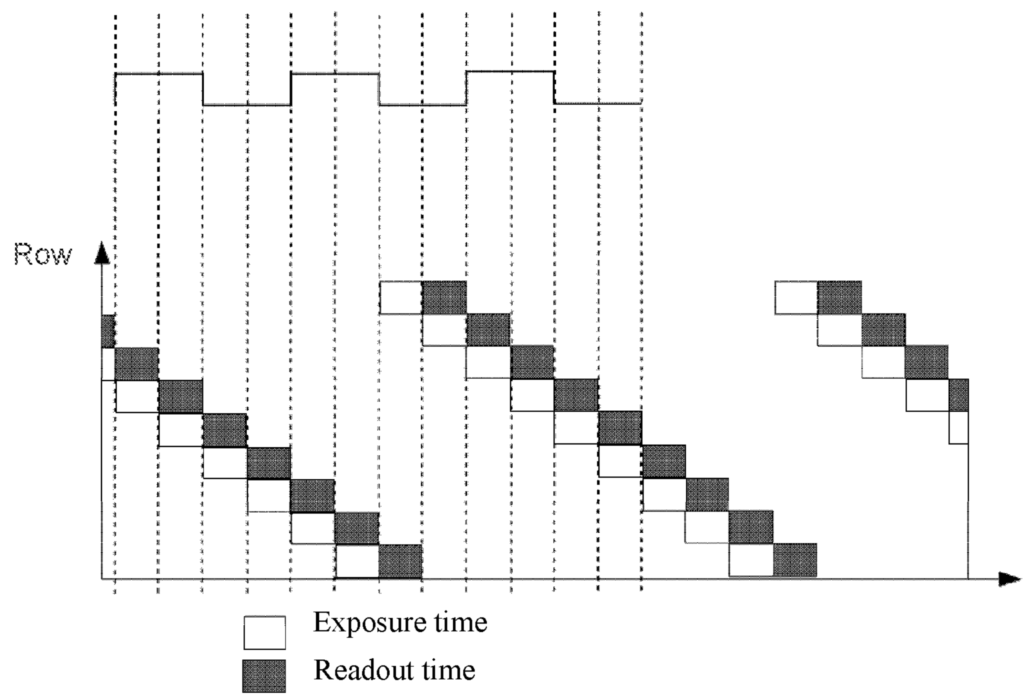
FIG. 8 is another exemplary imaging sequence diagram of a CMOS imaging device, according to an embodiment of the present disclosure.

The controller may set the flicker frequency of the light source through the driving mode, or set the duration of each turn-on and turn-off of the light source, so as to adjust the width of the stripes. A longer on/off duration usually corresponds to wider stripes. For example, in the case shown in FIG. 6, if the duration of each turn-on and turn-off of the light source is set to be approximately equal to the exposure time of each row of the CMOS imaging device (which may be set by the APP installed on the mobile phone or manually), stripes with a width of only one pixel may be produced during imaging. If the duration of each turn-on and turn-off of the light source is set to be approximately equal to twice the exposure time of each row of the CMOS imaging device, stripes with a width of about two pixels may be produced, as shown in FIG. 8, where the upper part of FIG. 8 shows a driving signal waveform of the driving mode of the light source, with a high level indicating turning on of the light source, and a low level indicating turning off of the light source. The driving signal frequency of the driving mode of FIG. 8 may be, for example, 16,000 times per second (the duration of each cycle is 62.5 μs, with the on/off duration each being approximately 31.25 μs). In the embodiment shown in FIG. 8, a duty cycle of a signal of the driving mode is set to about 50%, and the exposure time of each row is set to be approximately equal to the readout time of each row. However, it is contemplated that other settings are also possible as long as distinguishable stripes can be produced.

For the sake of simplicity of description, the light source and the CMOS imaging device are synchronized in FIG. 8, so that the on/off duration of the light source roughly corresponds to a starting or ending time of the exposure time of a certain row of the CMOS imaging device. However, it is contemplated that even if the two are not synchronized as shown in FIG. 8, obvious stripes can also be presented on the CMOS imaging device. At this moment, there may be some transition stripes, but there must be a row exposed when the light source is always off (i.e., the darkest stripe) and a row exposed when the light source is always on (i.e., the brightest stripe), separated by one pixel. Such variations in the lightness and darkness of the pixel rows (i.e., stripes) may be easily detected (e.g., by comparing the brightness or gray scale of some pixels in the imaging area of the light source). Furthermore, even if the row exposed when the light source is always off (i.e., the darkest stripes) or the row exposed when the light source is always on (i.e., the brightest stripes) does not exist, the variations in the lightness and darkness of the pixel rows may also be detected if there are rows in which the on duration t1 of the light source during the exposure time is less than a certain time duration or accounts for a small proportion of the entire exposure time (i.e., darker stripes), and rows in which the on duration t2 of the light source during the exposure time is greater than a certain time duration or accounts for a large proportion of the entire exposure time (i.e., brighter stripes), and t2–t1 is greater than a difference threshold (such as 10 μs) of the bright and dark stripes, or t2/t1 is greater than a ratio threshold (such as 2) of the bright and dark stripes. The difference threshold and the ratio threshold value of the bright and dark stripes are related to a luminous intensity of the optical tag, properties of the sensing device, the capturing distance and so on. It is contemplated that other thresholds are also possible, as long as a stripe pattern that can be distinguished by a computer may be produced.

A stripe pattern identification method according to an embodiment of the present disclosure includes following steps of: obtaining an image of an optical tag, and segmenting an imaging area of a light source by projection; collecting patterns with or without stripes under different configurations (such as different distances, and different flicker frequencies of light sources); normalizing all collected patterns to a specific size, such as 64*16 pixels; extracting each pixel feature (such as brightness, and color) as an input feature to construct a machine learning classifier; performing dichotomous discrimination to determine whether it is a pattern with or without stripes. It is contemplated that any other methods known in the art for stripe identification may be used, which will not be described in detail.

A strip-shaped light source with a length of 5 cm, when captured at a distance of 10 m (i.e., a distance of 200 times the length of the light source) with a mobile phone commonly available in the market having a resolution of 1080p, will occupy about 6 pixels in its length direction. If each stripe is 2 pixels wide, at least one obvious stripe, which can be easily identified, will be produced within the width range of 6 pixels. If a higher resolution is set, or an optical zoom is used, stripes can also be identified at a longer distance, for example at a distance of 300 or 400 times the length of the light source.

Figure 9:
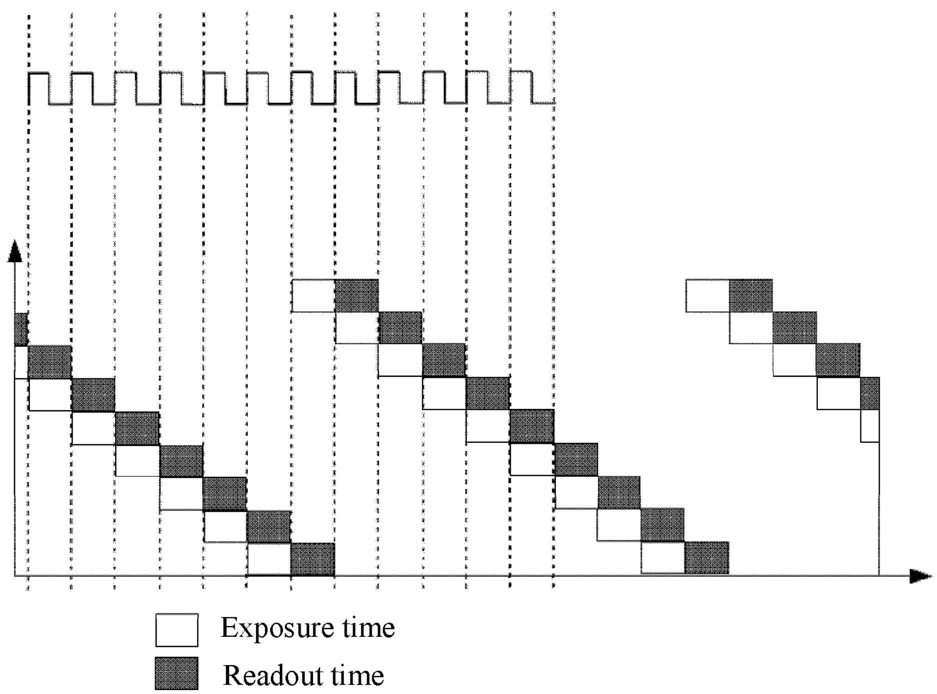
FIG. 9 is another exemplary imaging sequence diagram of a CMOS imaging device, according to an embodiment of the present disclosure.

The controller may also drive the light source in different driving modes to, for example, turn the light source on and off at another frequency. For the case shown in FIG. 6, the light source may be configured to be turned on and off at least once during the exposure time of each row of the CMOS imaging device, for example, 64000 times per second or more. FIG. 9 shows the case where the light source is turned on and off only once during the exposure time of each row, and the upper part of FIG. 9 shows a driving signal waveform of the driving mode of the light source, wherein a high level may correspond to turning on of the light source, and a low level may correspond to turning off of the light source. Since the light source will be turned on and off once in the same way during the exposure time of each row, and the exposure intensity energy obtained during each exposure time is approximately equal, so there will be no significant difference in brightness between the pixel rows finally imaged by the light source, and thus no stripes exist. It is contemplated that higher on and off frequencies are also possible. In addition, for the sake of simplicity of description, the light source and the CMOS imaging device are synchronized in FIG. 9, so that the on duration of the light source roughly corresponds to the starting time of the exposure time of a certain row of the CMOS imaging device. However, it is contemplated that even if the two are not synchronized as shown in FIG. 9, there will be no significant difference in brightness between the pixel rows finally imaged by the light source, and thus no stripes exist.

In another embodiment, when stripes are not desired, direct current may also be supplied to the light source to make the light source emit light with substantially constant intensity, so that stripes will not be presented on a frame of image of the light source obtained when the light source is captured with the CMOS image sensor. In this case, it is also possible to achieve approximately the same luminous flux in different driving modes, so as to avoid flicker phenomenon that may be perceived by human eyes when switching between different driving modes. In addition, it can be understood that when the light source of the present disclosure continuously operates in a certain driving mode, no flicker phenomenon will be perceived by human eyes.

Figure 10:
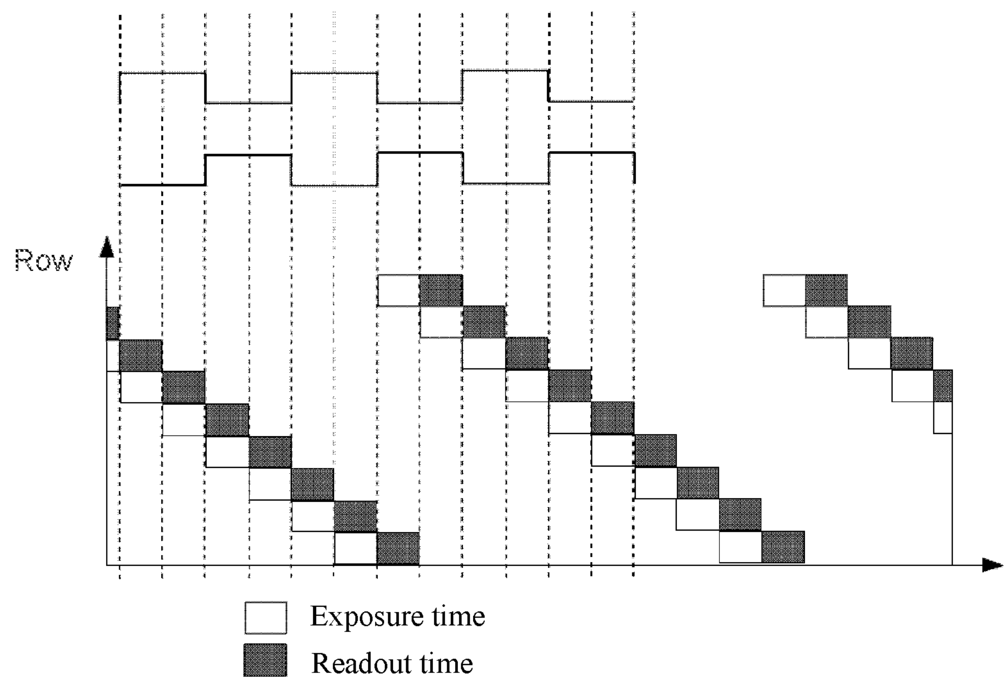
FIG. 10 is another exemplary imaging sequence diagram of a CMOS imaging device, according to an embodiment of the present disclosure.

FIG. 8 describes an embodiment in which stripes are produced by varying the intensity of light emitted by the light source (e.g., by turning the light source on or off). In another embodiment, as shown in FIG. 10, stripes may also be produced by enabling the light source to emit light of different wavelengths or colors. In the embodiment shown in FIG. 10, the light source includes a red light capable of emitting red light and a blue light capable of emitting blue light. The upper part of FIG. 10 shows driving signals of the driving mode of the light source, including a red light driving signal and a blue light driving signal, where a high level indicates turning on of a corresponding light source, and a low level indicates turning off of the corresponding light source. There is a phase shift of 180° between the red light driving signal and the blue light driving signal, i.e., the levels of the two signals are reversed. The red light driving signal and the blue light driving signal enable the light source to alternately emit red light and blue light outward, so that red and blue stripes are presented when the light source is imaged with the CMOS imaging device.

Figure 11:
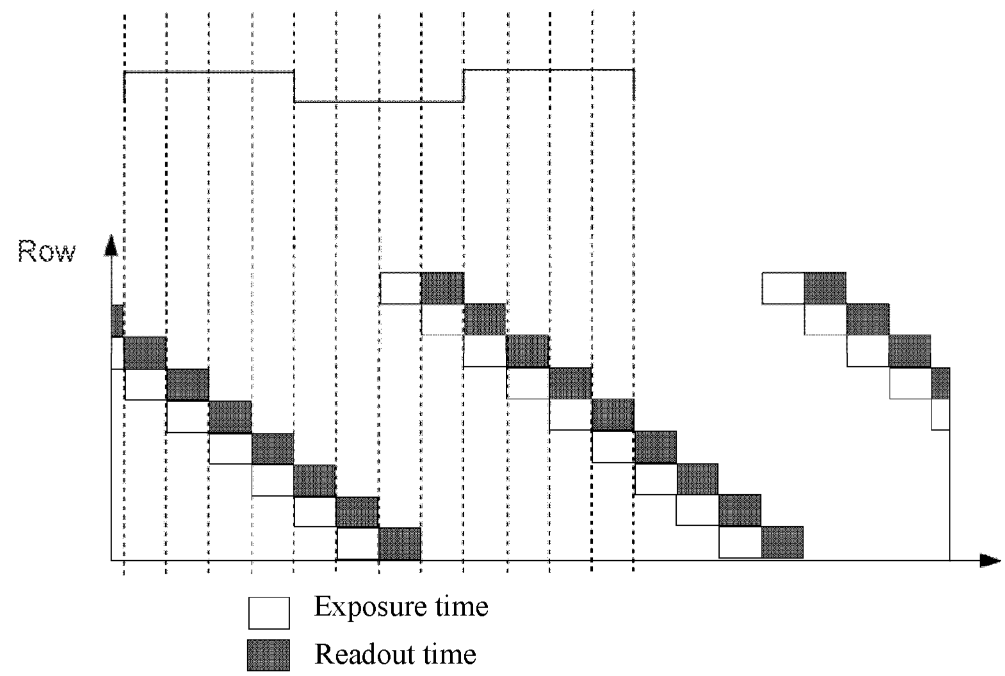
FIG. 11 is another exemplary imaging sequence diagram of a CMOS imaging device for implementing stripes different from those implemented by the imaging sequence diagram of FIG. 10, according to an embodiment of the present disclosure.

In an embodiment, stripes of different widths may be implemented based on different signal frequencies of the driving mode of the light source. For example, in the first driving mode, the light source may operate in the manner shown in FIG. 8, thus implementing a first stripe with a width of about two pixels. In the second driving mode, the duration of the high level and the low level in each cycle of the signal of the driving mode of the light source in FIG. 8 may be modified to twice the original one, thus implementing a second stripe with a width of about four pixels, as shown in FIG. 11. For example, the flicker frequency of an LED light may be set to 8000 times per second (the duration of each cycle is 125 μs, with the on/off duration each being about 62.5 μs).

In another embodiment, stripes of different colors may be implemented. For example, the light source may be set to include a red light capable of emitting red light and a blue light capable of emitting blue light. In the first driving mode, the blue light may be turned off and the red light may operate as shown in FIG. 8, thus implementing red-black stripes. In the second driving mode, the red light may be turned off and the blue light may operate as shown in FIG. 8, thus implementing blue-black stripes. In the above embodiment, the red-black stripes and the blue-black stripes are implemented using the same signal frequency in the first and second driving modes, but it can be understood that different driving signal frequencies may be used in the first and second driving modes.

In addition, it is contemplated that more than two kinds of stripes may be further implemented. For example, in the embodiment where the light source includes the red and blue lights, a third driving mode may be further set, in which the red and blue lights are controlled in the manner shown in FIG. 10 to implement red-blue stripes. In some embodiments, a stripe-free pattern may be further implemented optionally.

The controller may continuously drive the light source in corresponding driving modes according to the information to be transmitted over time (e.g., by setting the driving mode of the light source at a frequency of 30 times/second, i.e., setting the driving mode of the light source according to the information to be transmitted every 1/30 second), so that the light source can continuously transmit information to the outside. To identify the information transmitted by the light source, the CMOS imaging device may be adopted to scan the information to acquire one or more frames of images of the light source, so as to identify the information transmitted by the light source when each frame of images is captured through different patterns (e.g., patterns without stripes and patterns with various stripes) produced by the light source on each frame of images.

In the above, for the sake of description, a square wave is taken as an example to describe the driving mode having a corresponding signal frequency, but it is contemplated that other waveforms of signals, such as sine wave and triangular wave, may also be used in the driving mode.

In some applications, the light source will be affected by the ambient lighting conditions, interference, noise and other factors, which may affect the identification of the information transmitted by the light source. Therefore, to improve the identification accuracy, a pair of light sources are mutually referenced and used in conjunction in the optical tag according to the present disclosure, so as to transmit information together. This is very advantageous because the light sources in the optical tag are located at substantially the same position and subjected to the same ambient lighting conditions, interference, noise, and the like. Therefore, by comparing the images of a pair of light sources instead of analyzing the images of a certain light source individually, the accuracy and stability of the identification of the information transmitted by the light sources can be improved, so the present disclosure is especially suitable for long-range identification in complex environments. For example, when the first information needs to be transmitted, the controller may set the driving modes of the two light sources to be the same so that the two light sources can produce the same pattern (e.g., the same stripe) when captured with the rolling shutter imaging device. When there is a need to transmit other information different from the first information, the controller may set the driving modes of the two light sources to be different so that the two light sources can produce different patterns (e.g., different stripes) when captured with the rolling shutter imaging device. Here, different patterns may be stripes with different widths, or stripes with the same width but different locations (due to different phases of the driving modes of the light sources, which will be described in detail below), or stripes that differ in at least one of width, position, color and brightness.

Figure 12:
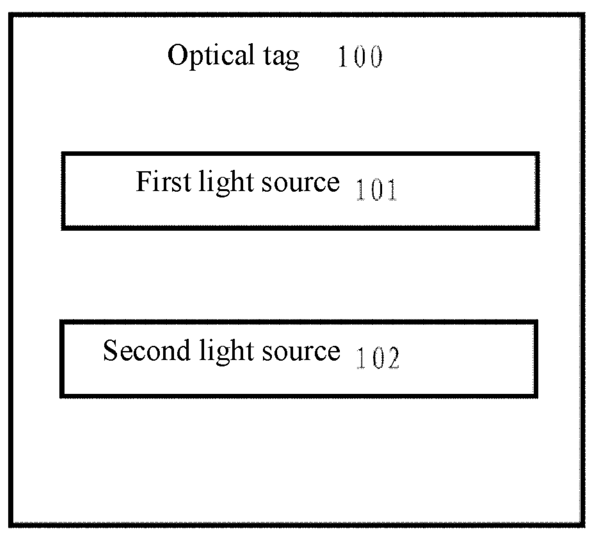
FIG. 12 shows an exemplary optical tag according to an embodiment of the present disclosure.

FIG. 12 shows an optical tag 100 (also referred to as an optical communication device) including two light sources (a first light source 101 and a second light source 102) according to an embodiment of the present disclosure. The optical tag 100 further includes a controller configured to drive the first light source 101 and the second light source 102 in a driving mode. The controller may be integrated with the light source in a housing, or may be located away from the light source as long as it can control the driving mode of the light source. For simplicity, the controller in the optical tag 100 is not shown in FIG. 12.

In an embodiment, the controller may drive the light source in a first driving mode or a second driving mode, where the first driving mode and the second driving mode may have the same or different frequencies. The first light source 101 and the second light source 102 may be used to transmit first information outward, such as binary data 0 if driven in the same driving mode at a given moment, and may be used to transmit second information different from the first information outward, such as binary data 1 if driven in different driving modes at a given moment. In an embodiment, for simplicity, one of the first light source 101 and the second light source 102 may always be driven in the same driving mode.

In an embodiment, when driven in different driving modes, the first light source 101 and the second light source 102 may further transmit different information according to their specific driving modes. For example, when the first light source 101 is driven in the first driving mode and the second light source 102 is driven in the second driving mode, second information may be transmitted, while when the first light source 101 is driven in the second driving mode and the second light source 102 is driven in the first driving mode, third information may be transmitted.

In an embodiment, the controller may drive the first light source 101 and the second light source 102 in more than two driving modes to improve the coding density. For example, the controller may drive the first light source 101 and the second light source 102 in a first driving mode, a second driving mode and a third driving mode. In this case, when driven in different driving modes, the first light source 101 and the second light source 102 may transmit more different information in their specific driving modes. For example, information transmitted when the first light source 101 is driven in the first driving mode and the second light source 102 is driven in the second driving mode may be different from the information transmitted when the first light source 101 is driven in the first driving mode and the second light source 102 is driven in the third driving mode.

Figure 13:
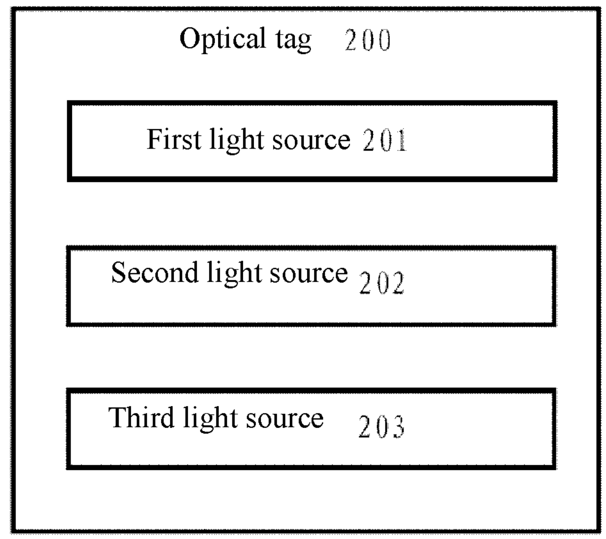
FIG. 13 shows another exemplary optical tag according to an embodiment of the present disclosure.

To improve the coding density, there may be three or more light sources in the optical tag. FIG. 13 shows an optical tag 200 including three light sources (a first light source 201, a second light source 202 and a third light source 203) according to an embodiment of the present disclosure. In this embodiment, the controller may drive the light sources in a first driving mode and a second driving mode, and determine two pairs of light sources accordingly, such as the first light source 201 and the second light source 202; and the second light source 202 and the third light source 203. Either of the two pairs of light sources may transmit different information depending on whether the light sources are driven in the same driving mode or not. In an embodiment, for simplicity, the second light source 202 common to the two pairs of the light sources may always be driven in the same driving mode.

In an embodiment, the controller may control on and off of the light source in a first driving mode having a first frequency and a first phase, and may also control on and off of the light source in a second driving mode which may have the same first frequency and a second phase different from the first phase. The first frequency may be a frequency between 15 Hz and 32 KHz, such as 15 Hz, 30 Hz, 50 Hz, 60 Hz, 80 Hz, 100 Hz, 200 Hz, 500 Hz, 1 KHz, 2 KHz, 4 KHz, 6 KHz, 8 KHz, 12 KHz, 16 KHz, and 32 KHz. In some embodiments, there is a phase difference of 180° between the first phase and the second phase (i.e., the two phases are inversed).

Figure 14:
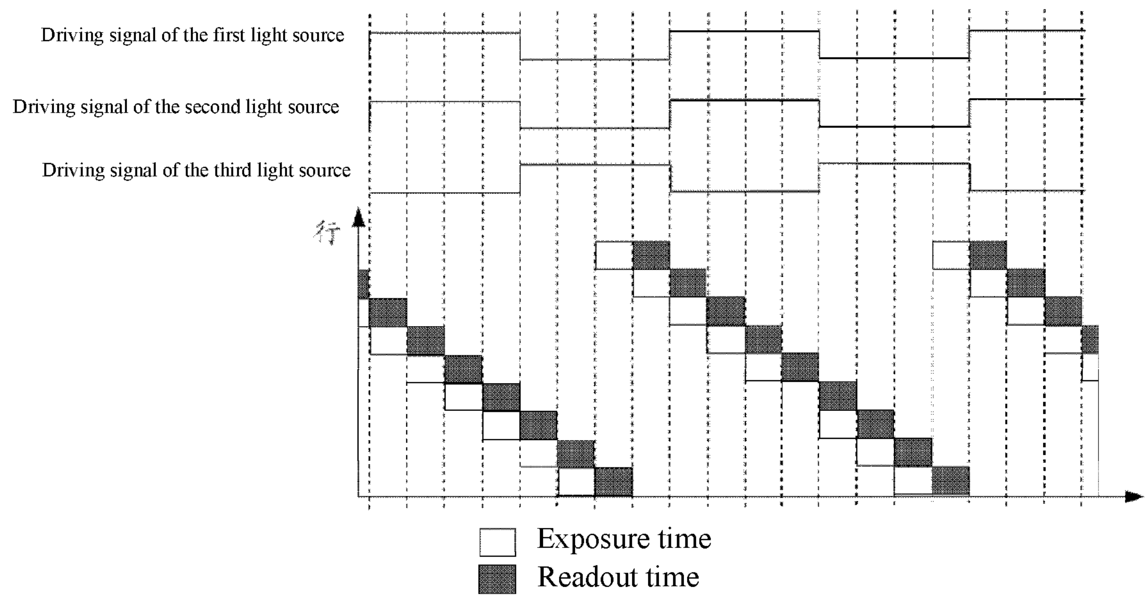
FIG. 14 shows another exemplary imaging sequence diagram of a CMOS imaging device according to an embodiment of the present disclosure.

FIG. 14 is an imaging sequence diagram of the CMOS imaging device for the optical tag shown in FIG. 13. Signals of the respective driving modes of the three light sources are shown in the upper portion of FIG. 14. In this embodiment, the signals may (but need not) have the same amplitude, where a high level may indicate that the light source is on, while a low level may indicate that the light source is off. However, it is contemplated that the high level and the low level may also correspond to the brightness of the light source, i.e., the change in brightness of the light source is controlled by the change in the signal amplitude instead of turning the light source on and off.

In FIG. 14, the first light source and the second light source are configured to transmit the first information at this moment, so the controller drives the first light source and the second light source in the same driving mode (e.g., in the first driving mode or the second driving mode). The second light source and the third light source are configured to transmit the second information at this moment, so the controller drives the second light source and the third light source in the two driving modes having the same frequency but a phase difference of 180° (e.g., in the first driving mode and the second driving mode, respectively). In this way, when the optical tag is imaged with the CMOS imaging device, the first light source, the second light source and the third light source all produce stripes of the same width, but the locations or phases of the stripes on the images of the first light source and the second light source are consistent (i.e., the rows where the bright stripes of the first light source are located are consistent with the rows where the bright stripes of the second light source are located, the rows where the dark stripes of the first light source are located are consistent with the rows where the dark stripes of the second light source are located), while the locations or phases of the stripes on the images of the second light source and the third light source are reversed (i.e., the rows where the bright stripes of the second light source are located are consistent with the rows where the dark stripes of the third light source are located, while the rows where the dark stripes of the second light source are located are consistent with the rows where the bright stripes of the third light source are located).

Figure 15:
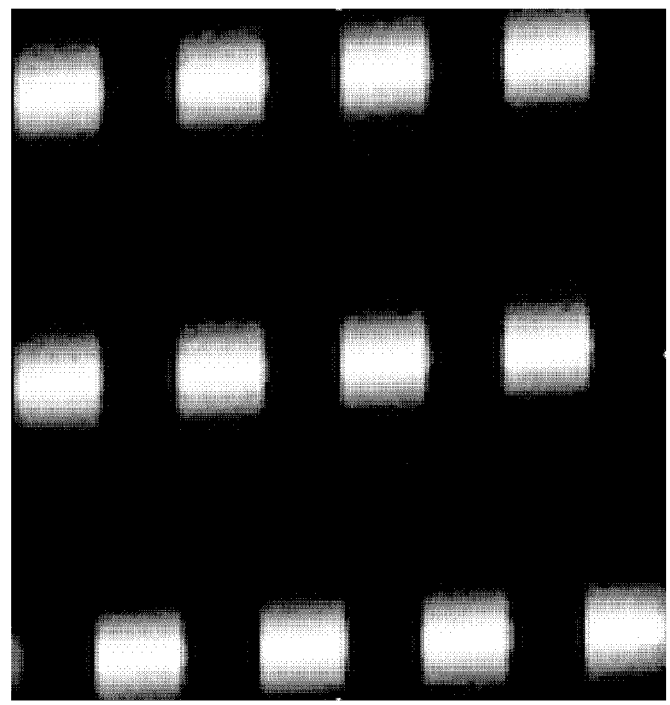
FIG. 15 is an exemplary imaging diagram implemented by controlling three light sources in a manner similar to FIG. 14, according to an embodiment of the present disclosure.

FIG. 15 shows an imaging diagram implemented by controlling the three light sources in a manner similar to FIG. 14. The stripe patterns at the top of FIG. 15 are the images of the first light source, those in the middle are the images of the second light source, and those at the bottom are the images of the third light source. The row scanning direction of the CMOS imaging device is vertical here. As shown in FIG. 15, the stripe patterns of the three light sources have the same width, but the locations or phases of the stripes on the images of the first and second light sources are consistent, while the locations or phases of the stripes on the images of the second and third light sources are reversed (i.e., the bright and dark stripes of the second light source correspond respectively to the dark and bright stripes of the third light source in the row scanning direction).

The imaging diagram shown in FIG. 15 obtained by the CMOS imaging device may be identified and decoded. In an embodiment, strip-shaped imaging areas corresponding to each light source may be taken from the imaging diagram separately, and projected in the vertical direction (i.e., the row scanning direction of the CMOS imaging device) to obtain three projection vectors: feature_vector [1], feature_vector [2], feature_vector [3]. The correlation coefficients of feature_vector [1] and feature_vector [2] as well as feature_vector [2] and feature_vector [3] are calculated respectively to obtain a corresponding correlation coefficient, coorelation_coefficient [1,2], of the first and second light sources as well as a correlation coefficient, coorelation_coefficient [2,3], of the second and third light sources. According to the imaging diagram shown in FIG. 15, the calculation results are as follows:

coorelation_coefficient [1,2]=0,912746;

coorelation_coefficient [2,3]=−0,96256.

It can be determined from the correlation coefficients that there is a strong correlation between the first light source and the second light source, indicating that the two sources are driven in the same driving mode with the same phase, and thus it is concluded that the information transmitted thereby is the first information, such as binary data 0. It can also be determined from the correlation coefficients that there is a negative correlation between the second light source and the third light source, indicating that the two sources are driven in two different driving modes with reversed phases, and thus it is concluded that the information transmitted thereby is the second information, such as binary data 1. Therefore, the result obtained by decoding the entire imaging diagram is, for example, a binary data sequence "01". It is contemplated that other image analysis methods known in the art may be adopted to analyze and decode the imaging diagram, as long as these methods can identify the similarities and differences of stripe patterns.

FIG. 15 shows a case where several bright stripes and dark stripes are accommodated in the imaging area of each light source. However, it is contemplated that when the light sources are driven in two driving modes having the same frequency but a phase difference of 180°, the imaging area of each light source does not need to accommodate a plurality of bright stripes or dark stripes, or even a complete bright stripe or dark stripe (because a part of stripes may also tell if there is bright or dark difference between the images of the two light sources). This means that the CMOS imaging device may be farther away from the optical tag (since no larger images of the light source are required to accommodate a plurality of bright stripes or dark stripes), or the signal frequency of the driving mode may be set to be relatively low (the relatively low frequency corresponds to a relatively wide stripe, and the relatively wide stripe may be used without having to image the light source to accommodate a plurality of bright stripes or even a complete bright stripe or dark stripe, i.e., the driving mode having a relatively low signal frequency, for example as low as 15 Hz, may be adopted). In the tests, an identification range up to 400 times the length of the light source can be obtained. In other words, when there is a light source with a length of 5 cm on the street, anyone within 20 m from the light source can identify the information transmitted by the light source using his or her mobile phone. If zooming and other technologies are further adopted, a larger identification range can be achieved.

The above description is made in connection with the optical tag 200 having three light sources in FIG. 13, but it is contemplated that two or more light sources are also possible.

In the above embodiments, it is taken as an example that there is a phase difference of 180° between the first driving mode and the second driving mode, but it can be understood that the phase difference between the first driving mode and the second driving mode is not limited to 180°, but may be set to other values, such as 90° and 270°. For example, in an embodiment, the phase of the first driving mode is set to 90° ahead of that of the second driving mode, so that the first information may be transmitted when the driving modes of the two light sources are the same, the second information may be transmitted when the first light source is driven in the first driving mode while the second light source is driven in the second driving mode, and the third information may be transmitted when the second light source is driven in the first driving mode while the first light source is driven in the second driving mode. In another embodiment, the controller may provide more driving modes to drive the light sources, where each driving mode may have a different phase. For example, in an embodiment, the phase of the first driving mode is set to 90° ahead of that of the second driving mode and 180° ahead of that of the third driving mode, so that first information may be transmitted when the driving modes of the two light sources are the same; the second information is transmitted when the first light source is driven in the first driving mode while the second light source is driven in the second driving mode; the third information is transmitted when the second light source is driven in the first driving mode while the first light source is driven in the second driving mode; and fourth information is transmitted when the first light source is driven in the first driving mode while the second light source is driven in the third driving mode (or vice versa).

In an embodiment, the driving modes of the light source provided by the controller can adopt different frequencies, so that when the light source is captured with the CMOS imaging device, patterns with stripes of different widths or a stripe-free pattern can be produced. For example, the controller may provide several driving modes at different frequencies for the light source, so that when the CMOS imaging device is adopted to capture the light source, patterns with a stripe width of 2 pixels, 4 pixels, 8 pixels, etc., or without stripes, may be produced, and the information transmitted by the light source can be identified by comparing these patterns with or without stripes. For example, two light sources having the same stripe width indicates that the information transmitted thereby is the first information. One light source having a stripe width about twice the stripe width of another light source indicates that the information transmitted thereby is the second information. One light source having a stripe width about 4 times the stripe width of another light source indicates that the information transmitted thereby is the third information, and so on.

Figure 16:
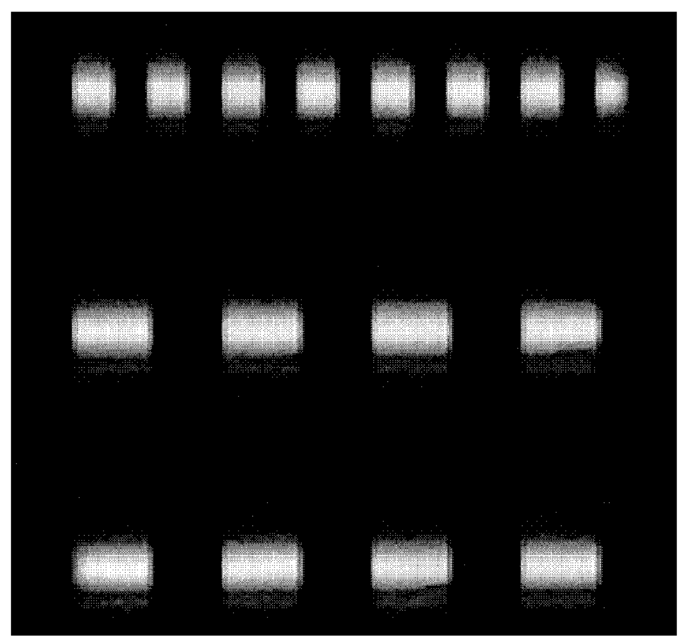
FIG. 16 is an exemplary imaging diagram implemented by an optical tag employing different stripe widths for information transmission, according to an embodiment of the present disclosure.

FIG. 16 shows an imaging diagram of the optical tag employing different stripe widths for information transmission, where the row scanning direction of the CMOS imaging device is vertical here. In this imaging diagram, the stripe patterns at the top are the images of the first light source, the stripe patterns in the middle are the images of the second light source, and the stripe patterns at the bottom are the images of the third light source. The second light source and the third light source have the same stripe width which is twice the stripe width of the first light source. If the first light source and the second light source are regarded as a pair of light sources mutually referenced and used in conjunction for information transmission, and the second light source and the third light source are regarded as another pair of light sources mutually referenced and used in conjunction for information transmission, it can be determined that the first light source and the second light source adopt the same driving mode, and thus it can be concluded that the information transmitted thereby is the first information, such as binary data 0. Moreover, it can be determined that the second light source and the third light source adopt two different driving modes at different frequencies (here, the frequency of the driving mode of the third light source is twice that of the second light source), and thus it can be concluded that the information transmitted thereby is the second information, such as binary data 1. Therefore, the result obtained by decoding the entire imaging diagram is, for example, a binary data sequence "01".

It is contemplated that different frequencies and phases may also be used in various driving modes provided by the controller, so that more information may be represented by different combinations of stripe width differences and phase differences. In an embodiment, among various driving modes provided by the controller, a greater variety of stripe patterns may be implemented alternatively or additionally by taking into account the color and/or intensity of light emitted by the light source. In fact, the stripes in different kinds of stripe patterns may be different in at least one of width, position, color and brightness, as long as these stripe patterns can be distinguished from each other.

The controller may continuously drive each light source in the optical tag in corresponding driving modes according to the information to be transmitted over time (e.g., by setting the driving modes of each light source in the optical tag at a frequency of 30 times/second, i.e., setting the driving mode of each light source in the optical tag according to the information to be transmitted every 1/30 second), so that the optical tag can continuously transmit information to the outside. The optical imaging device can scan the optical tag continuously to obtain one or more frames of images of the optical tag, so as to identify the information transmitted by the optical tag when each frame of images is captured, and the information can constitute a corresponding information sequence.

In an embodiment, the optical tag may additionally include one or more location identifiers located near the light source for transmitting information, and the one or more location identifiers may be, for example, one or more lights of a specific shape or color, which may be normally kept on during operation. The one or more location identifier can help users of optical imaging devices (such as mobile phones) easily find the optical tag. In addition, when an optical imaging device is set to capture the optical tag, the image of the location identifier is obvious and easy to be identified. Therefore, one or more location identifiers arranged near the light source for information transmission may also help the mobile phone to quickly determine the location of the light source for information transmission, thus facilitating the subsequent image identification. In an embodiment, the identification may be performed by first identifying the one or more location identifiers in the image, so that an approximate location of the optical tag may be found in the image. After identifying the one or more location identifiers, one or more areas in the image which cover the imaging location of the light source for information transmission may be determined based on a predetermined relative location relationship between the location identifier and the light source for information transmission. Then, these areas may be identified to determine the information transmitted by the light source.

Figure 17:
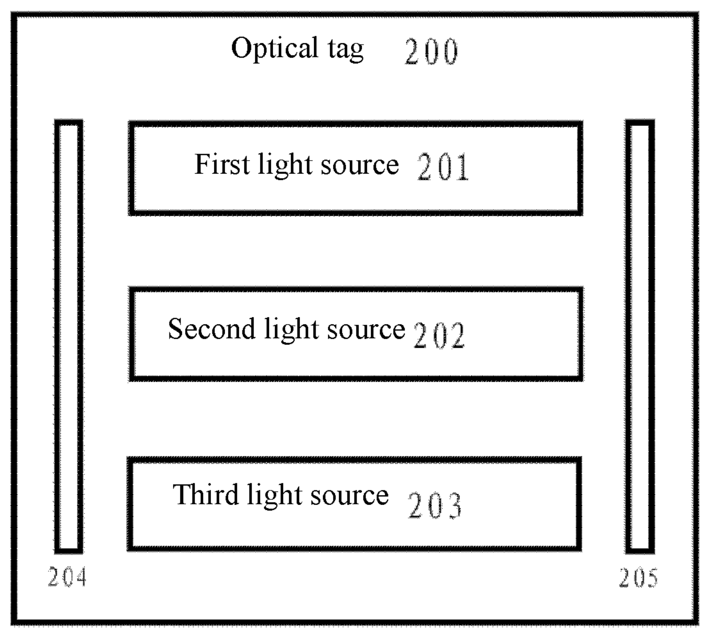
FIG. 17 is a schematic diagram of an exemplary optical tag including location identifiers according to an embodiment of the present disclosure.

FIG. 17 is a schematic diagram of the optical tag including location identifiers according to an embodiment of the present disclosure, which includes three light sources 201, 202 and 203 arranged horizontally for information transmission, and two location identifier lights 204 and 205 located vertically on two sides of the light sources for information transmission. The imaging areas of the light sources for information transmission can be conveniently determined by the location identifier lights and a predetermined relative location relationship between the location identifier lights and the light sources for information transmission.

Figure 18:
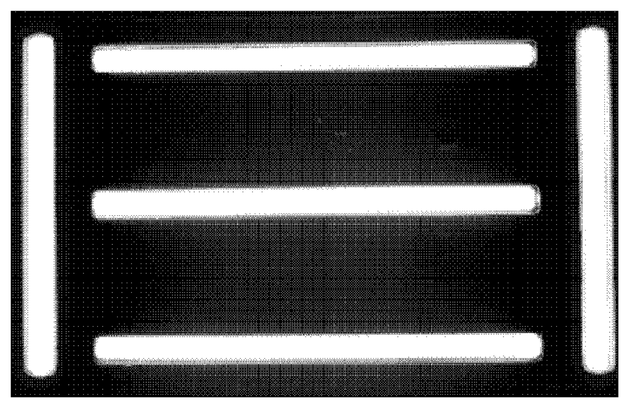
FIG. 18 shows an exemplary optical tag including location identifiers when viewed with naked eyes according to an embodiment of the present disclosure.

FIG. 18 shows an optical tag including location identifiers when viewed with naked eyes according to an embodiment of the present disclosure. In the optical tag, three light sources arranged horizontally for information transmission are transmitting information, and the two location identifier lights are located vertically on both sides of the light sources for information transmission. When viewed with naked eyes, the light sources for information transmission in the optical tag are similar to a common lighting source.

In an embodiment, the optical tag may include an ambient light detection circuit which may be configured to detect the intensity of ambient light. The controller may adjust the intensity of light emitted by the light source when the light source is turned on based on the intensity of ambient light detected. For example, when the ambient light is strong (e.g., during the day), the intensity of light emitted by the light source is relatively high, while when the ambient light is weak (e.g., at night), the intensity of light emitted by the light source is relatively low.

In the above scheme of the present disclosure, it is not required to perform accurate detection of images of any single light source but the images of a pair of light sources that are mutually referenced and used in conjunction are compared, and therefore extremely stable and reliable information transmission can be achieved in practice. Especially, in the present disclosure, the information transmitted by the light source are determined by comparing the images of a pair of light sources instead of analyzing the images of a single light source, which is very advantageous because the light sources in the optical tag are located at substantially the same position and subjected to the same ambient lighting conditions, interference, noise, and the like. Therefore, by comparing the images of a pair of light sources instead of only analyzing the images of a certain light source individually, the accuracy and stability for identifying the information transmitted by the light sources can be improved, so the present disclosure is especially suitable for long-range and outdoor identification.

Furthermore, more advantageously, as the information transmitted by the light sources is obtained by comparing the images of a pair of light sources according to the above scheme of the present disclosure, there is no need to include a large number of stripes in the image of each light source (in some cases, there is even no need to include a complete stripe), which further facilitates long-range identification and allows to reduce the signal frequency of the driving mode for generating stripes in the light source imaging. In an embodiment, when the imaging device is at a great distance from the optical tag, the image width of the light source in the optical tag may be much smaller than the width of a stripe, so the image of the light source is usually only a part of a bright stripe or a dark stripe, which makes the light source appear to transmit different data in a way similar to the on/off mode of the light source. However, it is possible to use a higher frequency compared with the on/off mode, so that the flicker phenomenon to the human eyes can be avoided, and uniform luminous flux of the light sources over time and uniform luminous flux between the light sources can be achieved.

References herein to "various embodiments," "some embodiments," "an embodiment," or "embodiments" mean that particular features, structures, or properties described in connection with the embodiments are included in at least an embodiment. Therefore, references herein to "in various embodiments," "in some embodiments," "in an embodiment," or "in the embodiment" do not necessarily refer to the same embodiment. Furthermore, the particular features, structures, or properties may be combined in any suitable manner in one or more embodiments. Therefore, particular features, structures, or properties shown or described in connection with an embodiment may be combined in whole or in part with the features, structures, or properties of one or more other embodiments without limitation, as long as the combination is logical and works. As used herein, expressions like "according to A" or "based on A" are intended to be non-exclusive, i.e., "according to A" may cover "only according to A" and may also cover "according to A and B", unless specifically stated or clearly understood from the context that its meaning is "only according to A". In the present application, some schematic operation steps are described in a certain order for clarity, but it is contemplated that each of these operation steps is not essential, and some of these steps may be omitted or replaced by other steps. Nor do these steps have to be performed sequentially in the manner shown. On the contrary, some of these steps may be performed in different sequences or in parallel according to actual needs, as long as the new performing manner is logical and works.

Having thus described several aspects of at least one embodiment of the present disclosure, it is understood that various variations, modifications and improvements can be readily made by those of skill in the art. Such variations, modifications and improvements are intended to be included within the spirit and scope of the present disclosure.

What is claimed is:

1. An optical communication device, comprising:

at least two light sources comprising a first light source and a second light source; and a controller configured to drive the first light source and the second light source in one or more driving modes, wherein when the controller drives the first light source and the second light source in a same driving mode, the first light source and the second light source transmit first information, when the controller drives the first light source and the second light source in different driving modes comprising a first driving mode and a second driving mode, the first light source and the second light source transmit other information different from the first information, wherein a driving signal of the first driving mode and a driving signal of the second driving mode have the same or different frequencies, wherein when the controller drives a light source among the at least two light sources in the first driving mode and a rolling shutter imaging device captures an image of the light source, the image captured of the light source presents a first stripe pattern, wherein when the controller drives a light source among the at least two light sources in the second driving mode and the rolling shutter imaging device captures an image of the light source, the image captured of the light source presents a stripe-free pattern or a second stripe pattern different from the first stripe pattern.

2. The optical communication device of claim 1, wherein when the controller drives the first light source in the first driving mode and the second light source in the second driving mode, the first light source and the second light source transmit second information; and when the controller drives the first light source in the second driving mode and the second light source in the first driving mode, the first light source and the second light source transmit third information.

3. The optical communication device of claim 1, wherein stripes in the first stripe pattern are different from stripes in the second stripe pattern in at least one of width, location, color or brightness.

4. The optical communication device of claim 1, wherein the driving signal of the first driving mode and the driving signal of the second driving mode have the same frequency but different phases.

5. The optical communication device of claim 4, wherein the driving signal of the first driving mode and the driving signal of the second driving mode have a phase difference of 90°, 180° or 270°.

6. The optical communication device of claim 1, wherein the driving signal of the first driving mode and the driving signal of the second driving mode have different frequencies, and the frequency of the driving signal of the second driving mode is N or 1/N times of the frequency of the driving signal of the first driving mode, where N is an integer greater than or equal to 2.

7. The optical communication device of claim 1, wherein when the frequency of the driving signal of the second driving mode is greater than the frequency of the driving signal of the first driving mode, the controller drives a light source among the at least two light sources in the second driving mode and a rolling shutter imaging device captures an image of the light source, the image captured of the light source presents a stripe-free pattern.

8. The optical communication device of claim 1, wherein the at least two light sources further comprise a third light source, wherein the controller is further configured to drive the third light source, wherein when the controller drives the first light source and the third light source in a same driving mode, the first light source and the third light source transmit the first information; when the controller drives the first light source and the third light source in different driving modes, the first light source and the third light source transmit the other information different from the first information.

9. A method for transmitting information using at least two light sources, wherein the at least two light sources comprise a first light source and a second light source configured to be driven in one or more driving modes, comprising:

driving the first light source and the second light source in a same driving mode for transmitting first information;

driving the first light source and the second light source in different driving modes including a first driving mode and a second driving mode for transmitting other information different from the first information, wherein a driving signal of the first driving mode and a driving signal of the second driving mode have the same or different frequencies;

capturing, using a rolling shutter imaging device, an image of a light source among the at least two light sources driven in the first driving mode, wherein the image captured of the light source presents a first stripe pattern; and capturing, using the rolling shutter imaging device, an image of a light source among the at least two light sources driven in the second driving mode, wherein the image captured of the light source presents a stripe-free pattern or a second stripe pattern different from the first stripe pattern.

10. The method of claim 9, wherein the other information is second information or third information, further comprising:

driving the first light source in the first driving mode and the second light source in the second driving mode for transmitting the second information; and driving the first light source in the second driving mode and the second light source in the first driving mode for transmitting the third information.

11. The method of claim 9, wherein stripes in the first stripe pattern are different from stripes in the second stripe pattern in at least one of width, location, color or brightness.

12. The method of claim 9, wherein the driving signal of the first driving mode and the driving signal of the second driving mode have the same frequency but different phases.

13. The method of claim 9, further comprising:

imaging the first light source and the second light source with an imaging device;

extracting an image of the first light source and an image of the second light source;

comparing the image of the first light source with the image of the second light source; and determining information jointly transmitted by the first light source and the second light source based at least in part on a result of the comparison.

14. The method of claim 13, wherein determining the information jointly transmitted by the first light source and the second light source based at least in part on the result of the comparison comprises:

if the image of the first light source and the image of the second light source are the same, determining that the information jointly transmitted by the first light source and the second light source is the first information; and if the image of the first light source and the image of the second light source are different, determining that the information jointly transmitted by the first light source and the second light source is other information different from the first information.

15. The method of claim 13, wherein comparing the image of the first light source with the image of the second light source comprises:

comparing the image of the first light source with the image of the second light source to determine whether the two images have a same stripe pattern.

16. A non-transitory computer-readable storage medium storing a computer program which, when executed, is configured to implement a method for transmitting information using at least two light sources, wherein the at least two light sources comprise a first light source and a second light source configured to be driven in one or more driving modes, wherein the method comprises:

driving the first light source and the second light source in a same driving mode for transmitting first information;

driving the first light source and the second light source in different driving modes including a first driving mode and a second driving mode for transmitting other information different from the first information, wherein a driving signal of the first driving mode and a driving signal of the second driving mode have the same or different frequencies;

causing a rolling shutter imaging device to capture an image of a light source among the at least two light sources driven in the first driving mode, wherein the image captured of the light source presents a first stripe pattern; and causing the rolling shutter imaging device to capture an image of a light source among the at least two light sources driven in the second driving mode, wherein the image captured of the light source presents a stripe-free pattern or a second stripe pattern different from the first stripe pattern.

* * * * *